United States Patent [19]
Clarke

[11] Patent Number: 5,816,625
[45] Date of Patent: Oct. 6, 1998

[54] QUICK RELEASE COUPLING WITH SPACER RING TO ALIGN SPLINE ROD

[76] Inventor: Robert H. Clarke, 1006 County Club Dr., Warsaw, Ind. 46580

[21] Appl. No.: 911,578

[22] Filed: Aug. 14, 1997

[51] Int. Cl.$^6$ ..................................................... F16L 37/08
[52] U.S. Cl. ........................................... 285/305; 285/321
[58] Field of Search ..................................... 285/321, 305

[56] References Cited

U.S. PATENT DOCUMENTS

| | | | |
|---|---|---|---|
| 3,381,983 | 5/1968 | Hanes ........................................ | 285/321 |
| 3,404,904 | 10/1968 | Roe .......................................... | 285/305 |
| 3,600,011 | 8/1971 | Alvis ......................................... | 285/305 |
| 3,606,402 | 9/1971 | Medney . | |
| 3,759,553 | 9/1973 | Carter . | |
| 3,767,234 | 10/1973 | Weirich et al. ........................... | 285/305 |
| 4,800,925 | 1/1989 | Yeoman .................................... | 285/321 |
| 5,083,820 | 1/1992 | Hopperdietzel ........................... | 285/305 |
| 5,255,945 | 10/1993 | Toon . | |
| 5,383,694 | 1/1995 | Taeuber .................................... | 285/321 |
| 5,636,878 | 6/1997 | Millward et al. . | |

FOREIGN PATENT DOCUMENTS 1238801  7/1960  France ...................................... 285/305

*Primary Examiner*—Eric K. Nicholson
*Attorney, Agent, or Firm*—Johnson Smith LLP; Dale G. Mohlenhoff

[57] ABSTRACT

A coupling assembly comprising a coupling having a pipe stop protruding from its inner surface, an o-ring groove between the pipe stop and the receiving end of the coupling, a spline insertion hole, and a coupling groove portion for receipt of a spline rod. The coupling assembly also includes a spacer ring and a pipe having a bevel portion at the insertion end of the pipe and a pipe groove portion on the flat, cylindrical surface of the pipe, wherein the tip of the insertion end of the pipe contacts the spacer ring upon insertion of the insertion end of the pipe into the receiving end of the coupling to position the pipe and align the first spline groove portion on the inner diameter of the coupling with the second spline groove portion on the outer diameter of the pipe to form a spline groove for receipt of a spline rod to lock the coupling and the pipe in place.

5 Claims, 3 Drawing Sheets

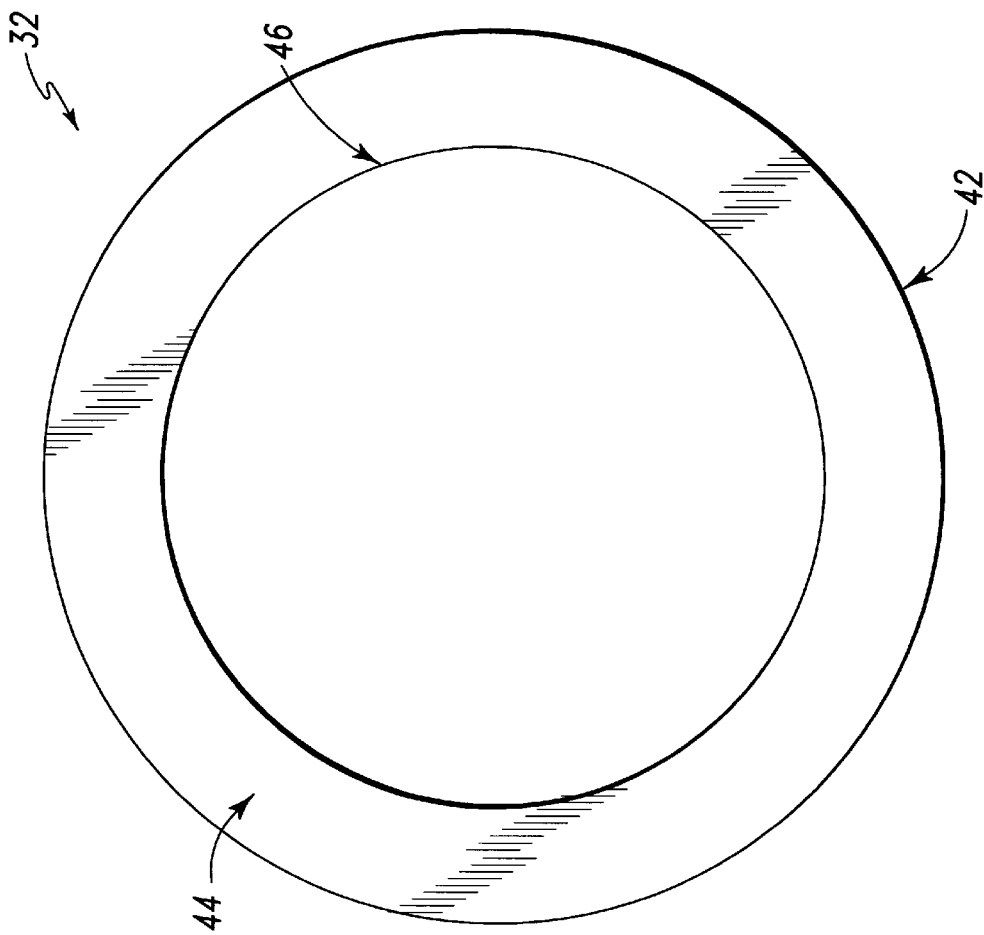

QUICK RELEASE COUPLING WITH SPACER RING TO ALIGN SPLINE ROD

FIELD OF THE INVENTION

The present invention relates generally to a design of a quick release coupling system uses existing coupling, a spacer and a newly designed pipe end to join a section of PVC pipe with a coupling and allow the user to assemble and disassemble the quick release coupling system with relative ease in the field.

DESCRIPTION OF THE PRIOR ART

While there are other coupling devices in the prior art, the present invention incorporates improvements that result in greater ease in connecting pipe with a coupling and in much greater ease in disassembling the quick release coupling system.

One example of a prior coupling device is disclosed in U.S. Pat. No. 5,636,878 naming William A. Millward, Alexander E. Bond, Geoffrey C. Eckold and D. Marsh as the inventors and Royal Ordnance PLC as the assignee. In the aforementioned U.S. Patent, a method of joining a coupling member to a pipe end is disclosed for a pipe of composite construction. This invention uses a groove or grooves in the outer surface of the pipe wall, a coupling member adapted to fit the end of the pipe, a key means and a curable resin. This invention was created to provide a better structural joint using adhesives and mechanical coupling. The type of pipe, the method and the functionality are materially different from the present invention and it is not designed to alleviate the decoupling problem the present invention addresses.

Another example of prior art is disclosed in U.S. Pat. No. 5,255,945 naming Donald A. Toon as the inventor and Solinst Canada Limited as the assignee. In the aforementioned U.S. Patent, a system for connecting sections of plastic tubing is disclosed. In this invention, a nose of one tube engages a sleeve on the neighboring tube. This system also incorporates a rectangular key and an O-ring seal. This arrangement was designed to provide a method to join pipes used for insertion into wells and other boreholes and is distinct from the present invention disclosed in this patent application.

Another example of prior art is disclosed in U.S. Pat. No. 3,759,553 naming Raymond Charles Carter as the inventor and Hepworth Plastics Limited as the assignee. In the aforementioned patent, a socket and spigot pipe coupling is disclosed in which a plastic material is added to increase the wall thickness to accommodate mating circumferential grooves to receive one or more thrust rods. This design is for mole-ploughing the pipes into the ground and is designed to transfer axial loads from one pipe to another. The basic design of this device is markedly distinct from the invention disclosed in this application in both function and design.

An additional example of prior art is disclosed in U.S. Pat. No. 3,606,402 naming Jonas Medney as the inventor and Fiberglass Resources Corporation as the assignee. In the aforementioned patent, a locking means for adjacent pipe sections is disclosed. In this invention a key is adapted to be inserted into a channel defined by opposed grooves in telescoped pipe sections providing a means for releasably locking the pipe section to each other. The key in this invention is a hexagonal polygon key in cross section. While this invention bears some resemblance to the spline rod and spline groove arrangement in the present invention, the present invention represents a significant design change by using the beveled pipe end and the spacer ring, which results in advantages both in assembling and disassembling the quick release coupling system assembly.

One of the major problems in the field with typical PVC pipe connections is getting them uncoupled after the pipe and coupling have been in service for some time. Typically, a pipe is inserted in a coupling and one or more o-rings are positioned within grooves in the inner wall of the coupling to seal the gap and to allow the pipe access in and out of the coupling since the o-rings are flexible and can be slightly deformed as the pipe is inserted. Then a spline or key means is inserted in a spline groove or keyway to hold the assembly together. Once the assembly has been in the field for a period of time, dirt and time have a tendency to "cement" the assembly together. Therefore, after removal of the spline or key, the quick release coupling system assembly can not be disassembled without great difficulty.

There have been attempts to solve or mitigate the problem, but none of the solutions have met the users' expectations. One method of addressing the problem in the past has been to apply various types of lubricants to the o-rings. This works well for a short period of time since the lubrication allows the pipe to be pulled out of the coupling due to the lubricant properties. However, over time the lubricant breaks down and the pipe can no longer be easily decoupled from the coupling.

Another method of addressing the problem of decoupling has been to alter the material used for the o-ring or to alter the durometer of the o-ring. Again, this solution works well for the short term, but over time the o-ring material becomes hard and brittle and the loss of compliancy does not provide for an easy decoupling.

Yet another approach has been to develop a tool which assists in decoupling. To date, a cost effective tool that works and is easy to use has not been identified.

Finally, many users in the field simply take a hammer to the coupling, destroying it in the process. Obviously, this is not the most desirable approach.

The present invention represents an improvement over the prior art due to the more simplistic design of the apparatus and the ease of coupling and uncoupling the assembly. Furthermore, the present invention's effectiveness does not deteriorate over time and does not destroy the components when decoupling is necessary.

SUMMARY OF THE INVENTION

The primary object of the present invention is to provide a plastic pipe coupling system that can be easily connected and easily disconnected.

Another object of the present invention is to provide the advantages of this design at a cost effective price.

Another object of the present invention is to provide a coupling system that is able to adapt to other types of PVC restrained joint pipe systems that are presently on the market.

The present invention utilizes a spacer ring which allows use of the invention on existing coupling and designs which are currently on the market to provide simplicity and cost effectiveness in the field, but also allows existing, competitive pipe and products to be used with the coupling upon removal of the spacer ring, thus increasing the potential market for the new invention.

The pipes used in this invention are primarily used in mining or tunneling operations, for municipal uses, for temporary water mains, for irrigation applications, for construction applications and for other similar applications.

These objects are accomplished by the present invention, a coupling system assembly comprising a coupling having a pipe stop protruding from its inner surface, an o-ring groove between the pipe stop and the receiving end of the coupling, a spline insertion hole, and a coupling groove portion for receipt of a spline rod. The coupling system assembly also includes a spacer ring and a pipe having a bevel portion at the insertion end of the pipe and a pipe groove portion on the flat, cylindrical surface of the pipe, wherein the tip of the insertion end of the pipe contacts the spacer ring upon insertion of the insertion end of the pipe into the receiving end of the coupling to position the pipe and align the first spline groove portion on the inner diameter of the coupling with the second spline groove portion on the outer diameter of the pipe to form a spline groove for receipt of a spline rod to lock the coupling and the pipe in place.

BRIEF DESCRIPTION OF DRAWINGS

In order that the invention can be more clearly ascertained, examples of preferred embodiments will now be described with reference to the accompanying drawings.

FIG. 3 is an cross sectional view of the spacer ring.

FIG. 4 is a outer circumference surface view of the spacer ring.

DESCRIPTION OF PREFERRED EMBODIMENTS

Figure 1:
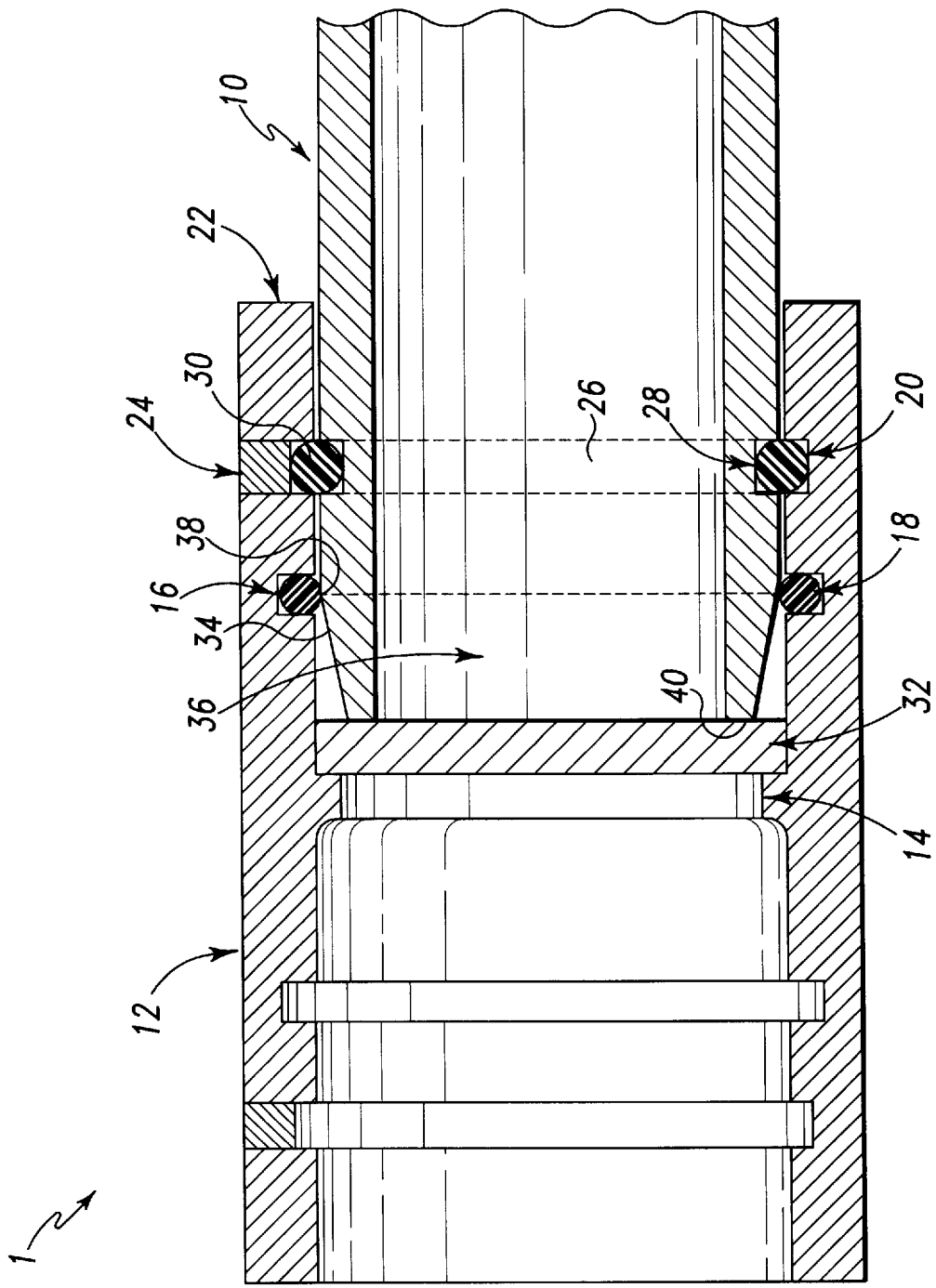
FIG. 1 is a cross-sectional view of the quick release coupling system connected to a typical pipe.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a cross-sectional view of a pipe 10 and coupling 12 in an assembled position is shown. A typical coupling 12, similar to that shown in FIG. 1, most commonly made of polyvinyl chloride or PVC contains a pipe stop 14 or raised portion which extends circumferentially from the inner surface of the coupling 12. In the current art, the pipe stop 14 is used to position the pipe 10 within the coupling 12. The coupling 12 also contains an o-ring groove 16 for receipt of an o-ring 18 between the pipe stop 14 and a coupling groove portion 20 of the coupling 12. The coupling groove portion or first spline groove portion 20 is located between the o-ring groove 16 and the receiving end 22 of the coupling 12. The distances between the receiving end 22 of the coupling 12 and the coupling groove portion 20, the coupling groove portion 20 and the o-ring groove 16 and the o-ring groove 16 and the pipe stop 14 are determined by industry standards and the size of the pipe 10 and coupling 12. In the typical configuration, the pipe 10 is inserted into the receiving end 22 of the coupling 12 such that a spline insertion hole 24 through the wall of the coupling 12 is aligned with a spline groove 26 extending circumferentially within the quick release coupling system coupling/pipe 1 and formed by opposing groove portions, the coupling groove portion 20 extending circumferentially within the coupling 12 and a pipe groove portion or second spline groove portion 28 extending circumferentially in the outer diameter of the pipe 10. A spline rod 30 is then inserted into the spline insertion hole 24 and through the spline groove 26 to lock the quick release coupling system 1 in place.

A spacer ring 32 is inserted in the receiving end 22 of the coupling 12 to provide for properly seating the pipe 10 and aligning the two opposing groove portions of the spline groove 26. The spacer ring 32 is provided separately and can be mounted within the coupling 12 at any time prior to assembly of the coupling 12 and the pipe 10. The spacer ring 32 is mounted parallel to and against the pipe stop 14 to essentially adjust the pipe stop 14 position without altering the coupling design. The spacer ring 32 can be interference or pressed fit within the coupling 12 using knurling, dimpling or some other raised surface which provides a texture and a slightly greater diameter to the outer circumference of the spacer ring. It is also possible to adhesively mount the spacer ring 32 against the pipe stop 14 using an adhesive applied to a cross sectional surface of the spacer ring 32 for insertion parallel to and against the pipe stop 14.

A bevel portion or taper 34 at the insertion end 36 of the pipe 10 begins at the the break 38 or the initial deviation from the flat, cylindrical portion on the outer wall of the pipe 10 which is also the precise point of the centerline of the o-ring 18 when the pipe 10 is inserted and properly seated in the coupling 12. The bevel portion 34 extends for a specified distance from the tip 40 of the insertion end 36 of the pipe 10 to the break 38. The specified distance is determined by the size of pipe 10 and the coupling 12 used in a particular application. Various pipe/coupling sizes are used by the various manufacturers in accordance with existing industry standards and the spacer ring 32 and bevel portion 34 combination are sized accordingly to provide the proper seating position for the pipe 10. The spline insertion hole 24 in the coupling allows for the insertion of a spline rod 30 into the spline groove 26 on the inner wall of the coupling 12. The spline rod 30 is typically made of a durable plastic material that is flexible enough to be guided through the spline groove 26, however various composites and other similar materials may be used which have adequate strength and flexibility. The spline groove 26 is formed from the opposing positions of the coupling groove portion 20 and the pipe groove portion 28. The spline groove 26 is located between the o-ring 18 and the receiving end 22 of the coupling 12. A spline rod 30 is inserted in the spline insertion hole 24 after the pipe 10 has been inserted and properly seated within the coupling 12. The spline rod 30 then enters the spline groove 26 and locks the quick release coupling system assembly 1 in place. When the user wants the quick release coupling system 1 decoupled, the spline rod 30 is removed from the spline groove 26 and due to the position of the o-ring 18 over the break 38, the quick release coupling system 1 can be decoupled with only slight movement of the pipe 10. It is necessary to only move the o-ring 18 slightly off the break 38 to accommodate decoupling. The angle of the bevel portion 34 is such that no further interference with the o-ring 18 occurs once the o-ring 18 is moved off of the break 38.

Figure 2:
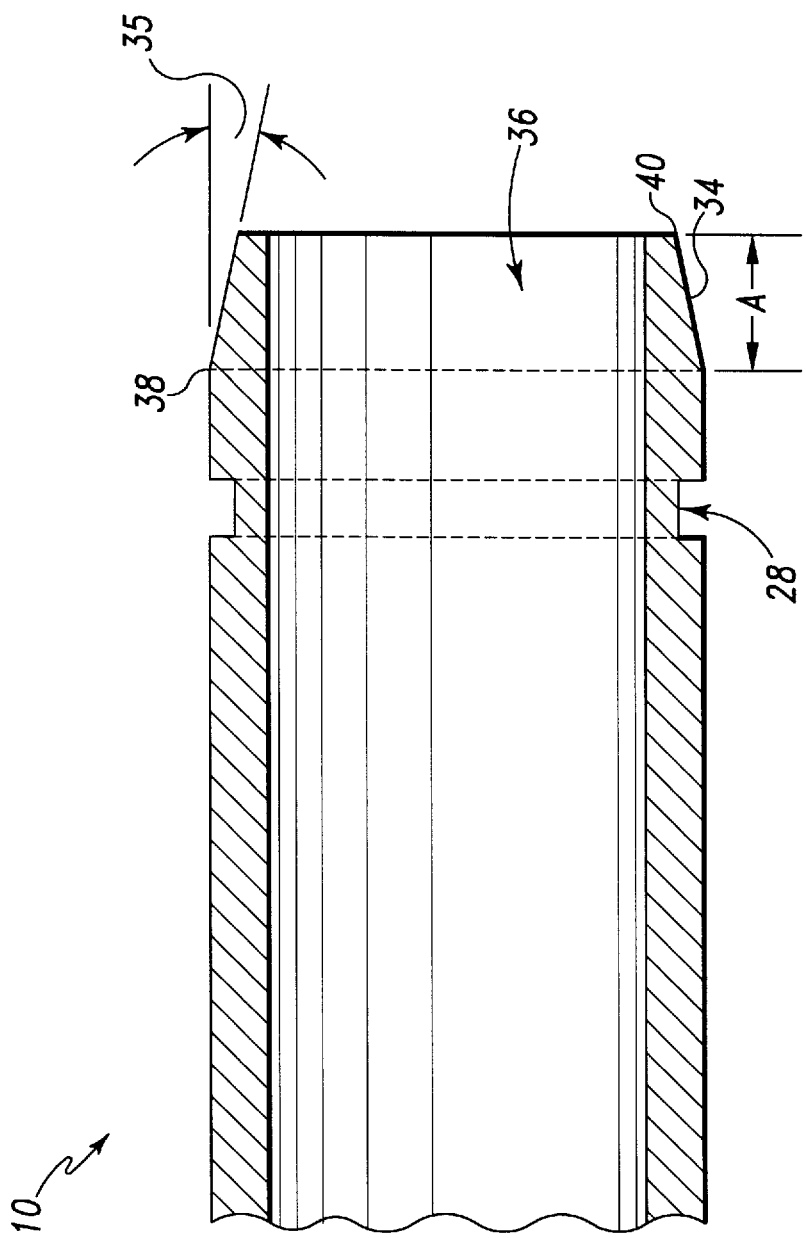
FIG. 2 is a cross sectional view of a typical insertion end of a pipe.

Referring now to FIG. 2, a typical insertion end 36 of the pipe 10 is shown. The insertion end 36 of the pipe 10 contains a pipe groove portion 28 and the bevel portion 34 at the insertion end 36 of the pipe 10. The bevel portion angle 35 illustrates the angle between a line extending from the flat, cylindrical portion on the outer wall of the pipe 10 and the bevel portion 34. The bevel portion angle 35 must be between 3 and 10 degrees, however, 6 degrees is the angle used in the preferred embodiment. The pipe groove portion 28 is located at a point more distant from the insertion end 35 of the pipe 10 than the break 38 of the bevel portion 34 or on the consistently cylindrical portion of the pipe 10 such that the pipe groove portion 28 will align with the coupling groove portion 20 located on the coupling 12 when the pipe 10 is inserted and properly positioned in the coupling 12. The pipe groove portion 28 of the spline groove 26 extends circumferentially around the outer wall of the pipe 10.

Referring now to FIG. 3, the cross section of a spacer ring 32 is shown. The spacer ring 32 has an outer circumference surface 42 and an inner diameter 46. The spacer ring 32 is circular in shape and open in the center to provide a passage for the fluids flowing within the pipe 10 and coupling 12. The spacer ring 32 is typically made of nipple stock but can actually be any material that is corrosion resistant and tough enough to position the pipe 10 and maintain its position without substantial deformation. The outer circumference surface 42 can be pressed fit inside of the coupling 12 or the cross-sectional surface 44 can be adhesively mounted parallel to and against the pipe stop 14.

Referring now to FIG. 4, the edge of the spacer 32 or the outer circumference surface 42 is shown. In the preferred embodiment, the spacer ring 32 is pressed fit and the outer circumference surface 42 of the spacer ring 32 must be increased slightly and provided with a textured surface to ensure that the outer circumference surface 42 is in tight contact with the inner wall of the coupling 12 to hold the spacer ring 32 in place. Knurling, dimpling or another similar type of treatment can be performed on the outer circumference surface 42 of the spacer ring 32 to accomplish this result.

The spacer ring 32 varies in thickness and circumference depending on the pipe 10 used in a particular application. Typically, the spacer ring 32 is 0.375 inches thick for pipes ranging from 2 inches to 8 inches in diameter. The circumference of the spacer ring 32 corresponds to the circumference of the inner wall of the coupling 12. For pipes ranging in thickness from 10 inches to 12 inches, the preferable spacer ring thickness is 0.400 inches. The spacer ring thicknesses, however, can be adapted to accommodate any thickness necessary to properly seat or position a pipe 10 within a coupling 12 which can range between 0.200 inches and 0.500 inches.

The spacer ring 32 must be inserted in any of the existing couplings on the market in order to make the invention operate properly. However, the spacer ring 32 can be removed and a typical pipe currently found in the market can again be used in the coupling 12. Consequently, the adaptability of this invention in the field is very important. With the simple addition or removal of the spacer ring, the pipe design of the present invention can be used or existing pipe can be used, respectively.

The pipe 10 can be any length but is typically assembled in twenty foot sections. The pipe 10 used in the described quick release coupling system 1 ranges in size from 2 inches to 12 inches in diameter and will accommodate pressures of 160 psi to 500 psi.

Other modifications may be made without departing from the ambit of the invention, the nature of which, is to be determined from the foregoing description and the appended claim.

It is claimed:

1. A quick release coupling system, comprising:

a) a spacer ring to limit pipe insertion, said spacer ring inserted into the receiving end of a coupling and the outer circumference surface of said spacer ring is press fit against said inner surface of said coupling such that the cross sectional surface of said spacer ring is parallel and against the front surface of said pipe stop to provide proper seating for said pipe; and b) a pipe having a bevel portion at the insertion end of said pipe to facilitate ease of assembly and disassembly, said bevel portion extending from the tip of said insertion end of said pipe to a break, said break beginning at the centerline of said o-ring when said pipe is inserted and properly positioned within said coupling and a pipe groove portion on the flat, cylindrical surface of said pipe, wherein the tip of said insertion end of said pipe contacts said spacer ring upon insertion of said insertion end of said pipe into said receiving end of said coupling to position said pipe and align said pipe groove portion and said coupling groove portion to form a spline groove for receipt of said spline rod to lock said coupling and said pipe in place.

2. The quick release coupling system of claim 1, wherein said spacer ring is between 0.400 and 0.500 inches for pipes 8 inches and larger in diameter and between 0.300 and 0.400 inches for pipes less than or equal to 6 inches in diameter.

3. The quick release coupling system of claim 1, wherein said bevel portion angle is between 5 degrees and 7 degrees.

4. The quick release coupling system of claim 1, wherein said outer circumference surface of said spacer ring is pressed fit against said inner surface of said coupling by knurling or dimpling the surface of said outer circumference surface of said spacer ring to provide for the precise location of said spacer ring for proper seating and ease of assembly and disassembly.

5. The quick release coupling system of claim 1, wherein said spacer ring is inserted into the receiving end of said coupling and the cross section surface of said spacer ring is placed in adhesive contact parallel to and against the front surface of said pipe stop to provide proper seating for said pipe.

* * * * *